C. F. LONG.
FISH BAIT BUCKET.
APPLICATION FILED MAY 26, 1914.
1,159,399.
Patented Nov. 9, 1915.
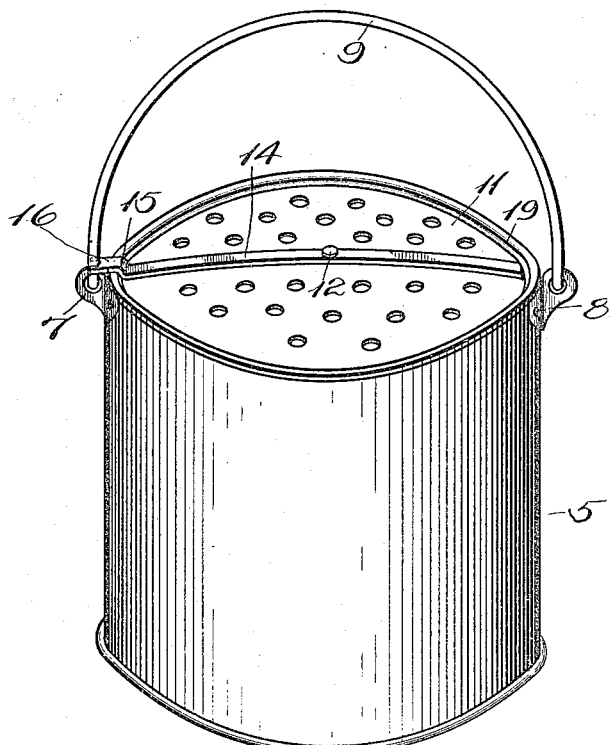
Fig. I.
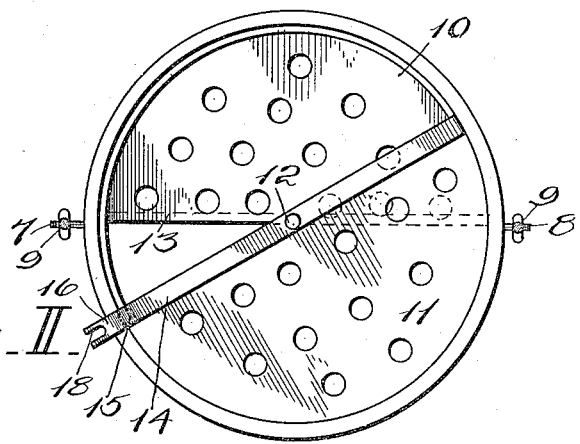
Fig. II.
Witnesses
Inventor
C. F. Long,
By Clayton
Attorney

UNITED STATES PATENT OFFICE.

CLARENCE F. LONG, OF MASON CITY, IOWA.

FISH-BAIT BUCKET.

1,159,399.  Specification of Letters Patent.  Patented Nov. 9, 1915.

Application filed May 26, 1914. Serial No. 841,035.

*To all whom it may concern:*

Be it known that I, CLARENCE F. LONG, a citizen of the United States, residing at Mason City, in the county of Cerro Gordo and State of Iowa, have invented certain new and useful Improvements in Fish-Bait Buckets, of which the following is a specification.

This invention relates to a bucket adapted to be used for the transporting of fish bait or for the storing of the same therein. This bucket, however, can be used for various purposes wherein a ventilation is desirable.

One of the objects of the invention is to provide a bucket which can be cheaply manufactured and a bucket which will meet with commercial approval owing to its simplicity.

In carrying out my invention I have endeavored to construct the same as cheaply and with as few parts as possible.

Referring to the drawings Figure 1 represents a perspective view of my improved bucket and Fig. 2 discloses a top plan view of the bucket.

Like numerals refer to like parts in the different views.

In Fig. 1 the numeral 5 discloses a bucket provided with the usual bottom 6. This bucket may be built up or may be stamped from a solid piece of metal, whereby the bottom and sides may be integral. I provide on the bucket 2 ears 7 and 8 to which I attach the usual bail 9. Rigidly fastened upon the top is a perforated cover 10, covering but half of the bucket opening. The remainder of the opening is covered by a pivoted member 11 and adapted to rotate upon the pivot 12. The member 10 is braced by a transverse member 13 shown in dotted lines in Fig. 2. The member 11 is braced by a member 14 which extends entirely across the top and is bent upwardly as at 15 and outwardly as at 16. The end of 16 is notched as at 18. This member 16 forms a handle by which the member 11 can be rotated upon its pivot 12 and when in a closed position this notch 18 will engage with the lower end of the bail 9 and provide a lock for holding the member 11 in a closed position and at the same time it will hold the bail 9 in a vertical position so that it can be easily grasped. The member 11 is preferably made from sheet metal so that it will be provided with an upstanding flange 19. This flange runs entirely around the bucket top and serves to strengthen the same.

From the foregoing description it will be seen that I have invented a new and useful device and What I desire to claim is:—

1. In a bucket provided with a bail, the combination with a permanent cover, covering but half of said bucket, a rotatable cover covering the other half of said bucket, said second mentioned cover being rotatably pivoted upon said first mentioned cover, means for rotating said rotatable cover, said means also forming a lock to prevent rotation of said cover when brought into engagement with the bail upon said bucket and forming means to hold said bail erect when engaged therewith.

2. The combination with a bucket; of a cover for said bucket consisting of two segmental parts, one of said parts being fixedly secured to the bucket and the remaining part being rotatably mounted to cover and uncover the opening left by the fixed part, a bar fixed to and rotatable with the last-mentioned part, one end of said bar projecting over the edge of the bucket and being provided with an end notch, and a bail pivoted to the bucket and engageable in the notch when the bail is in raised position whereby the bail is held raised and the movable part of the cover held from rotation.

In testimony whereof I affix my signature in presence of two witnesses.

CLARENCE F. LONG.

Witnesses:
 GRACE MINER,
 HARRY S. CLEVELAND.

Copies of this patent may be obtained for five cents each, by addressing the "Commissioner of Patents, Washington, D. C."